(12) United States Patent
Jansky et al.

(10) Patent No.: US 10,620,803 B2
(45) Date of Patent: Apr. 14, 2020

(54) SELECTING AT LEAST ONE GRAPHICAL USER INTERFACE ITEM (71) Applicant: Microsoft Technology Licensing, LLC, Redmond, WA (US)

(72) Inventors: Martin Jansky, Espoo (FI); Apaar Tuli, Helsinki (FI); Erkko Anttila, Espoo (FI); Timo-Pekka Viljamaa, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 14/868,672

(22) Filed: Sep. 29, 2015

(65) Prior Publication Data
US 2017/0090725 A1 Mar. 30, 2017

(51) Int. Cl.
*G06F 3/048* (2013.01)
*G06F 3/0484* (2013.01)
*G06F 3/0488* (2013.01)
*G06F 3/0482* (2013.01)
*G06F 3/041* (2006.01)
*G06F 3/01* (2006.01)

(52) U.S. Cl.
CPC ........ *G06F 3/04842* (2013.01); *G06F 3/0414* (2013.01); *G06F 3/0482* (2013.01); *G06F 3/0488* (2013.01); *G06F 3/04883* (2013.01); *G06F 2203/04105* (2013.01)

(58) Field of Classification Search
CPC .. G06F 3/04842; G06F 3/0414; G06F 3/0482; G06F 3/04883
See application file for complete search history.

(56) References Cited

U.S. PATENT DOCUMENTS

| 6,259,436 | B1  | 7/2001 | Moon et al. |
| 7,966,573 | B2  | 6/2011 | Dodge et al. |
| 8,514,221 | B2* | 8/2013 | King ................... G06F 3/04883 341/20 |
| 8,818,624 | B2  | 8/2014 | Small et al. |
| 9,001,059 | B2  | 4/2015 | Wibbeler |
| 9,292,192 | B2* | 3/2016 | Thorsander ........... G06F 3/0488 |
| 2008/0174570 | A1 | 7/2008 | Jobs et al. |

(Continued)

OTHER PUBLICATIONS

Sullivan, Mark., "How Apple's Force Touch feature could be hugely useful to iPhone users", Published on: May 26, 2015 Available at: http://venturebeat.com/2015/05/26/how-apples-force-touch-feature-could-be-hugely-useful-to-iphone-users/.

(Continued)

*Primary Examiner* — Nicholas Augustine (57) ABSTRACT

An apparatus is provided. The apparatus comprises at least one processing unit, at least one memory, a pressure level sensitive user input device, and a graphical user interface. The at least one memory stores program instructions that, when executed by the at least one processing unit, cause the apparatus to detect that a pressure level applied on the pressure level sensitive user input device at a touching point exceeds a predetermined pressure level, the touching point corresponding to a location on the graphical user interface, detect an increase in the applied pressure level, and expand a selection area from the location in response to the increase in the applied pressure level to select at least one graphical user interface item.

20 Claims, 5 Drawing Sheets (56) References Cited

U.S. PATENT DOCUMENTS

| | | | |
|---|---|---|---|
| 2009/0237372 A1 | 9/2009 | Kim et al. | |
| 2009/0307623 A1* | 12/2009 | Agarawala | G06F 3/04815 715/765 |
| 2010/0053151 A1* | 3/2010 | Marti | G06F 3/011 345/419 |
| 2010/0100842 A1 | 4/2010 | Kim | |
| 2010/0149096 A1* | 6/2010 | Migos | G06F 3/0425 345/158 |
| 2010/0234094 A1* | 9/2010 | Gagner | G07F 17/32 463/20 |
| 2011/0043491 A1* | 2/2011 | Oh | G06F 3/0234 345/177 |
| 2011/0154196 A1* | 6/2011 | Icho | G06F 3/0485 715/702 |
| 2011/0248941 A1* | 10/2011 | Abdo | G06F 3/0488 345/173 |
| 2012/0079414 A1 | 3/2012 | Eischeid et al. | |
| 2012/0096349 A1* | 4/2012 | Zheng | G06F 3/042 715/702 |
| 2012/0262386 A1* | 10/2012 | Kwon | G06F 3/04883 345/173 |
| 2012/0297885 A1 | 11/2012 | Hou et al. | |
| 2013/0063364 A1* | 3/2013 | Moore | G06F 3/0416 345/173 |
| 2014/0359528 A1* | 12/2014 | Murata | G06F 3/0488 715/833 |
| 2015/0138116 A1* | 5/2015 | Lee | G06F 3/0414 345/173 |
| 2015/0234518 A1* | 8/2015 | Teller | G06F 3/0414 345/173 |
| 2015/0268725 A1* | 9/2015 | Levesque | G06F 3/016 345/156 |
| 2016/0188181 A1* | 6/2016 | Smith | G06F 3/0414 715/765 |
| 2016/0274761 A1* | 9/2016 | Alonso Ruiz | G06F 3/04886 |

OTHER PUBLICATIONS

Miyaki, et al., "GraspZoom: zooming and scrolling control model for single-handed mobile interaction", In Proceedings of the 11th International Conference on Human-Computer Interaction with Mobile Devices and Services, Sep. 15, 2009, 4 pages.

* cited by examiner

SELECTING AT LEAST ONE GRAPHICAL USER INTERFACE ITEM

BACKGROUND

When using a touch-sensitive user interface, for example, a touch-sensitive display, a user is able to browse through content on the display via touch on the display. An item on the display may be selected by tapping the display on the location of the object or link. The user may also be able to select more than one item on the display.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an apparatus is provided. The apparatus comprises at least one processing unit, at least one memory, a pressure level sensitive user input device, and a graphical user interface. The at least one memory stores program instructions that, when executed by the at least one processing unit, cause the apparatus to detect that a pressure level applied on the pressure level sensitive user input device at a touching point exceeds a predetermined pressure level, the touching point corresponding to a location on the graphical user interface, detect an increase in the applied pressure level, and expand selection or a selection area from the location in response to the increase in the applied pressure level to select at least one graphical user interface item.

In another embodiment, a method is provided. The method comprises detecting that a pressure level applied on a pressure level sensitive user input device at a touching point exceeds a predetermined pressure level, the touching point corresponding to a location on a graphical user interface, detecting an increase in the applied pressure level, and expanding selection or a selection area from the location in response to the increase in the applied pressure level to select at least one graphical user interface item.

In another embodiment, an apparatus is provided. The apparatus comprises at least one processing unit, at least one memory and a touch and pressure level sensitive display configured to provide a graphical user interface. The at least one memory stores program instructions that, when executed by the at least one processing unit, cause the apparatus to detect that a pressure level applied on the touch and pressure level sensitive display at a touching point exceeds a predetermined pressure level, the touching point corresponding to a location on the graphical user interface, detect an increase in the applied pressure level, and expand selection or a selection area from the location in response to the increase in the applied pressure level to select at least one graphical user interface item.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

Figure 1:
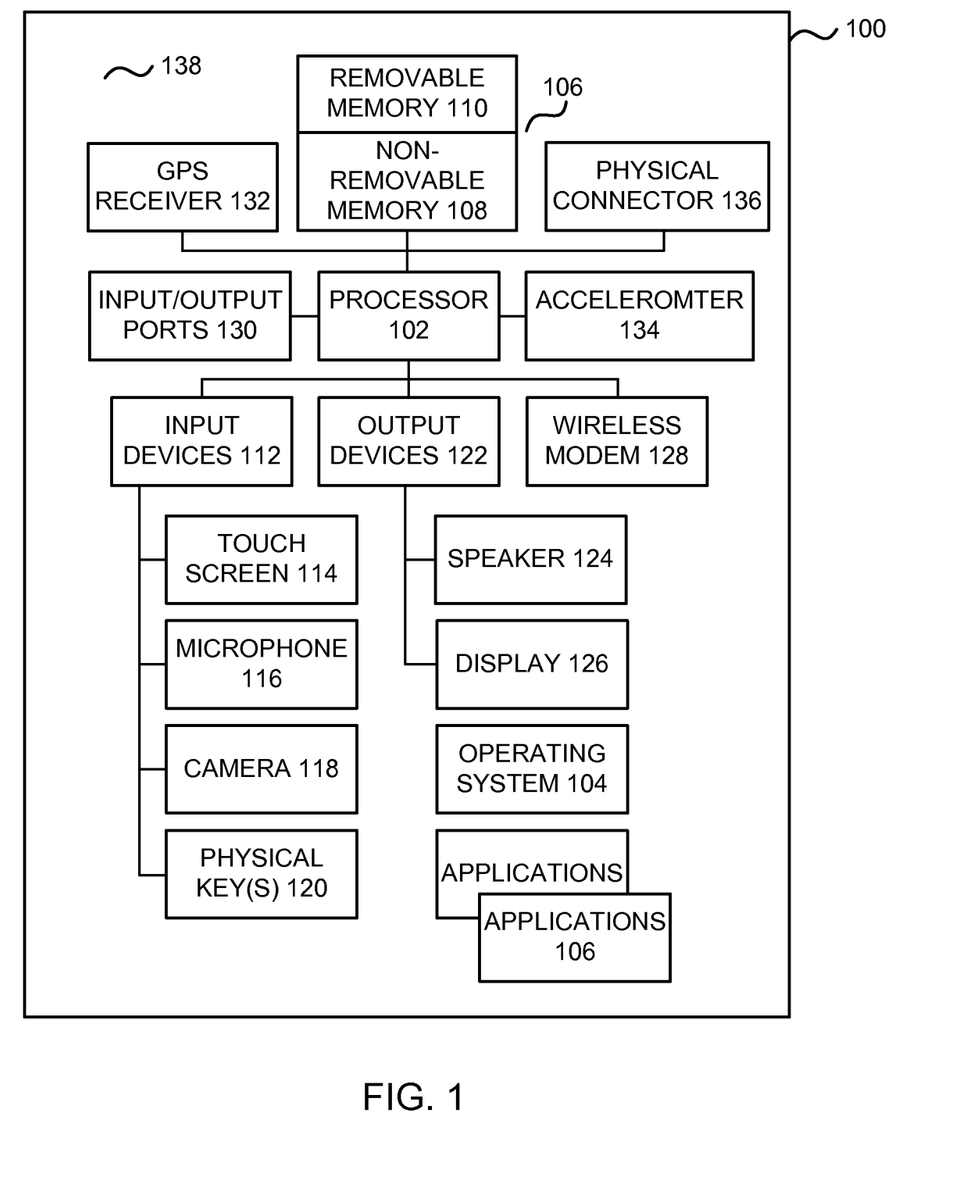
FIG. 1 is a system diagram depicting an apparatus including a variety of optional hardware and software components.

FIG. 1 is a system diagram depicting an apparatus 100 including a variety of optional hardware and software components, shown generally at 138. Any components 138 in the apparatus can communicate with any other component, although not all connections are shown, for ease of illustration. The apparatus can be any of a variety of computing devices (for example, a cell phone, a smartphone, a handheld computer, a tablet computer, a Personal Digital Assistant (PDA), etc.) and can allow wireless two-way communications with one or more communications networks, such as a cellular or satellite network.

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components 138 and support for one or more application programs 106. The application programs can include common computing applications (e.g., email applications, calendars, contact managers, web browsers, messaging applications), or any other computing application.

The illustrated apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in GSM communication systems, or other well-known memory storage technologies, such as "smart cards." The memory 106 can be used for storing data and/or code for running the operating system 104 and the applications 106. Example data can include web pages, text, images, sound files, video data, or other data sets to be sent to and/or received from one or more network servers or other devices via one or more wired or wireless networks. The memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120 and one or more output devices 122, such as a speaker 124 and a display 126. Other possible output devices (not shown) can include piezoelectric or other haptic output devices. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 106 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with a mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the apparatus and a public switched telephone network (PSTN) etc.

The apparatus 100 can further include at least one input/output port 130, a satellite navigation system receiver 132, such as a Global Positioning System (GPS) receiver, an accelerometer 134, and/or a physical connector 136, which can be a USB port, IEEE 1394 (FireWire) port, and/or RS-232 port. The illustrated components 138 are not required or all-inclusive, as any components can deleted and other components can be added.

Figure 2A:
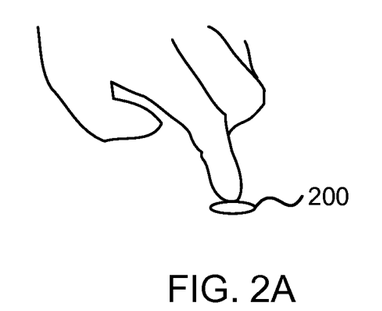
FIG. 2A illustrates an embodiment for selecting at least one graphical user interface item.
Figure 2B:
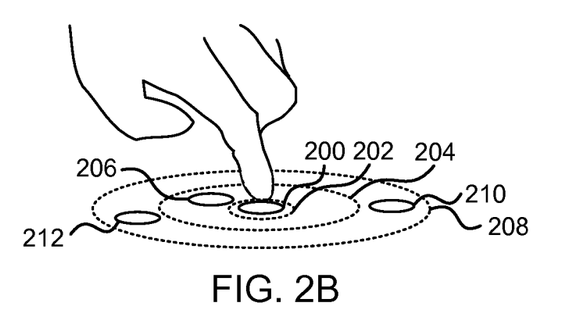
FIG. 2B illustrates an embodiment for selecting at least one graphical user interface item.

FIGS. 2A and 2B illustrate an embodiment for selecting at least one graphical user interface item. A graphical user interface item 200 may be any user interface item on the graphical user interface providing information to a user. The item may comprise text, an image, audio, video, a link or any other content that can be shown on the graphical user interface and is selectable by the user, for example, with a finger, multiple fingers or a stylus. FIGS. 2A and 2B illustrate the embodiment using a touch-sensitive display as an example of the graphical user interface, wherein the touch-sensitive display is also able to detect multiple pressure levels when pressure is applied on the touch-sensitive display. Instead of the touch-sensitive display, it is possible to use a separate pressure level sensitive user input device, for example, a touch pad for detecting the user's touch and a separate display device for providing a graphical user interface to display the user's actions.

In FIG. 2A, the user applies pressure, for example, with a finger, multiple fingers or a stylus, on the item 200 on the touch-sensitive display. If the pressure level applied on the touch-sensitive display exceeds a predetermined pressure level, a selection area 202 may be provided on the touch sensitive display. The selection area 202 may be a separate visible area on the touch-sensitive display. Alternatively, the appearance of the item 200 may be changed to indicate that it has been selected. Alternatively or in addition, tactile or audio feedback may be given to the user. If after that an increase is detected in the applied pressure level, the selection area 202 is expanded in response to the increase in the applied pressure level. FIG. 2B illustrates that at first the selection area is small. When the user increases the pressure on the item 200, the selection area 202 increases to a larger selection area 204. As can be seen from FIG. 2B, the selection area 204 now embraces the items 202 and 206. If the user still increases the pressure level applied on the item 200, the size of the selection area 204 still increases to a selection area 208. Now the selection area embraces the items 200, 206, 210 and 212. The expansion of the selection area 202 may be proportional to the increase in the applied pressure level. If the user lifts his finger or decreases the pressure level below the predetermined pressure level, the item or items within the latest selection area may remain selected, and the user is able to take further actions on the item(s).

By enabling the user to use pressure or different pressure levels to select items on the graphical user interface, a simple and intuitive selection method is provided.

In one embodiment of FIG. 2B, the expansion of the selection area 202 is directly proportional to the increase in the applied pressure level. The user is thus able to easily control the size of the expansion area by controlling the amount of pressure applied on the item 200.

Figure 3:
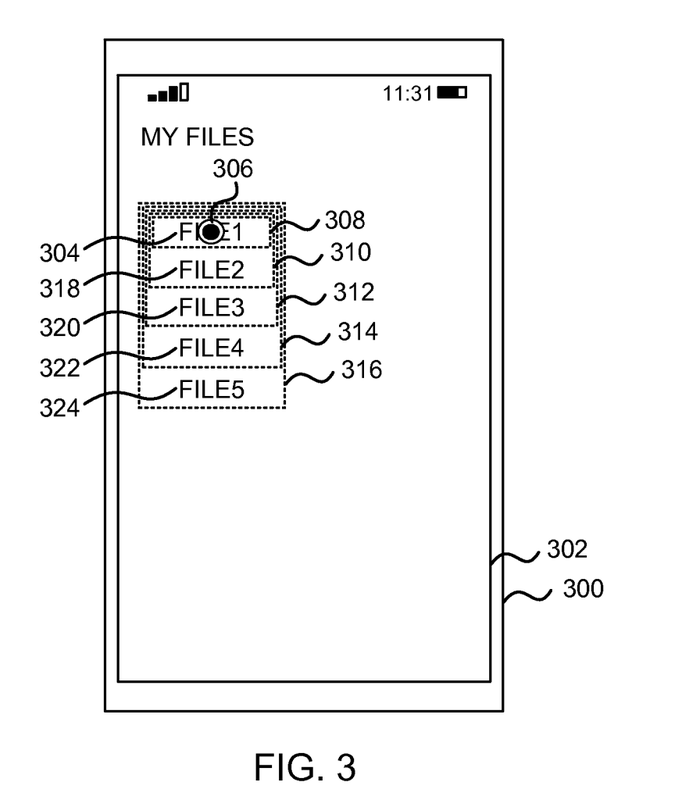
FIG. 3 illustrates an embodiment for selecting at least one graphical user interface item.

FIG. 3 illustrates an embodiment for selecting at least one graphical user interface item 304, 318-324 with an apparatus 300 providing a graphical user interface 302. A graphical user interface item 304 may be any user interface item on the graphical user interface providing information to a user. In the embodiment of FIG. 3, the item 304 is a file, for example, an image file. FIG. 3 illustrates the embodiment using a touch-sensitive display as an example of the graphical user interface, wherein the touch-sensitive display is also able to detect multiple pressure levels when pressure is applied on the touch-sensitive display. Instead of the touch-sensitive display, it is possible to use a separate pressure level sensitive user input device, for example, a touch pad for detecting the user's touch and a separate display device for providing a graphical user interface to display the user's actions.

In FIG. 3 the user applies 306 pressure, for example, with a finger, multiple fingers or a stylus, on the item 304 on the touch-sensitive display. If the pressure level applied on the touch-sensitive display exceeds a predetermined pressure level, a selection area 308 may be provided on the touch sensitive display. The selection area 308 may be a separate visible area on the touch-sensitive display. Alternatively, the appearance of the item 304 may be changed to indicate that it has been selected. Alternatively or in addition, tactile or audio feedback may be given to the user. If after that an increase is detected in the applied pressure level, the selection area 308 is expanded in response to the increase in the applied pressure level.

FIG. 3 illustrates four subsequent selection area sizes 310-316. The selection area 308 may grow to the subsequent selection areas 310-316 in response to an increase in the applied pressure level on the item 318. In one embodiment, the increase in the size of the selection area 308 is directly proportional to the increase in the applied pressure level on the item 304. The more the user applies pressure on the item 304, the larger the selection area becomes, as illustrated by the references 308-316.

In another embodiment, after applying a pressure level exceeding the predetermined pressure level, the user needs only once increase the pressure level further in order to control the size of the selection area 308. Alternatively, the user may also keep substantially the same pressure level. If the user keeps substantially the same or the increased pressure level, a timer may be used to expand the selection area step by step. For example, the selection area 308 may be expanded to the selection area 310 after 0.5 s etc.

If the user lifts his finger or decreases the pressure level below the predetermined pressure level, the item or items within the latest selection area remain selected, and the user is able to take further actions on the item(s).

FIG. 3 illustrates a simple and efficient solution for selecting multiple items in one direction only. Further, the user is easily able to control the amount of selected items.

Figure 4A:
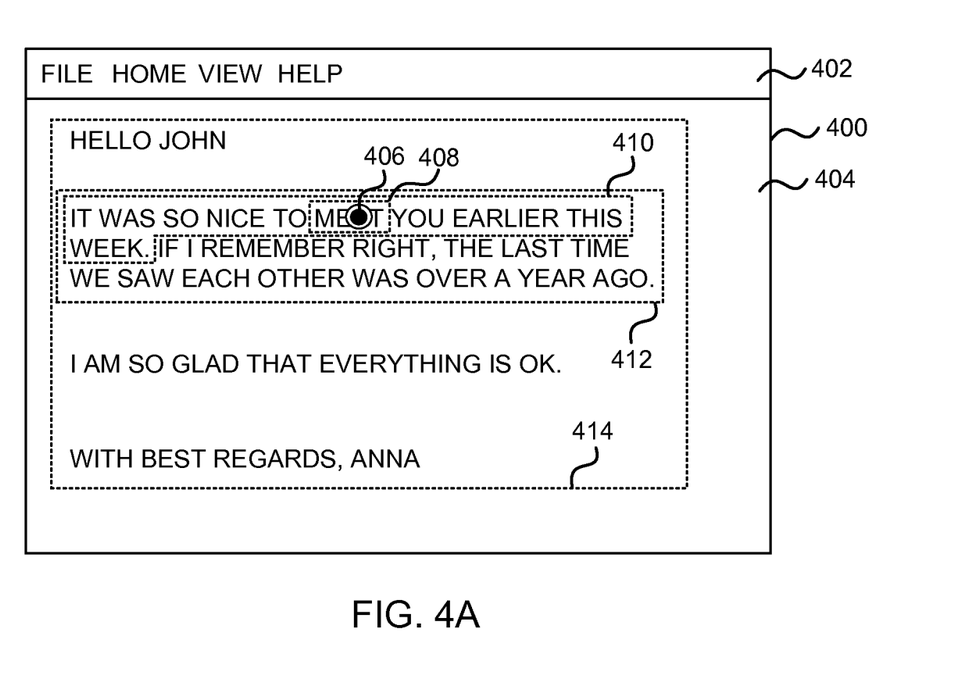
FIG. 4A illustrates an embodiment for selecting text in a word processing application.

FIG. 4A illustrates an embodiment for selecting at least one graphical user interface item with an apparatus 400 providing a graphical user interface. FIG. 4A illustrates a simplified word processing application view. The application view comprises a set of menu items 402 for selecting various processing functions. The application view comprises also a window 404 in which a user is able to input text. FIG. 4A illustrates the embodiment using a touch-sensitive display as an example of the graphical user interface, wherein the touch-sensitive display is also able to detect multiple pressure levels when pressure is applied on the touch-sensitive display. Instead of the touch-sensitive display, it is possible to use a separate pressure level sensitive user input device, for example, a touch pad for detecting the user's touch and a separate display device for providing the graphical user interface to display the user's actions.

In this example, the user has written a brief message to John and wishes to select a text portion from the message. When the user applies 406 pressure on a certain part of the text (here on the word "meet") and if the applied pressure level exceeds a predetermined pressure level, a selection area 408 may be provided on the touch sensitive display. The selection area 408 may be a separate visible area on the touch-sensitive display (for example, a dashed line rectangle as illustrated in FIG. 4A). Alternatively or in addition, tactile or audio feedback may be given to the user. Alternatively or in addition, the appearance of the word "meet" may be changed to indicate that it has been selected, by visually emphasizing, for example, by bolding the selected text. If after that an increase is detected in the applied pressure level, the selection area 408 may be expanded in response to the increase in the applied pressure level.

In this embodiment, the selection area 408 first expands to a sentence level 410. If the user continues to increase the pressure level applied on the word "meet", the selection area 410 expands further to a paragraph level 412. If the user still continues to increase the pressure level applied on the word "meet", the selection area 412 expands further to a page level 414.

In another embodiment, after applying a pressure level exceeding the predetermined pressure level, the user needs only once increase the pressure level further in order to control the size of the selection area 408. If the user keeps the increased pressure level, a timer may be used to expand the selection area step by step. For example, the selection area 408 may be expanded to the selection area 410 after 0.5 s etc.

If the user lifts his finger or decreases the pressure level below the predetermined pressure level, the text within the selection area that was the latest selection area may remain selected, and the user is able to take further actions on the text.

FIG. 4A illustrates a simple and intuitive solution for selecting text on a graphical user interface since the user does not have to move his finger or a stylus in order to select a larger text portion than just one word.

Figure 4B:
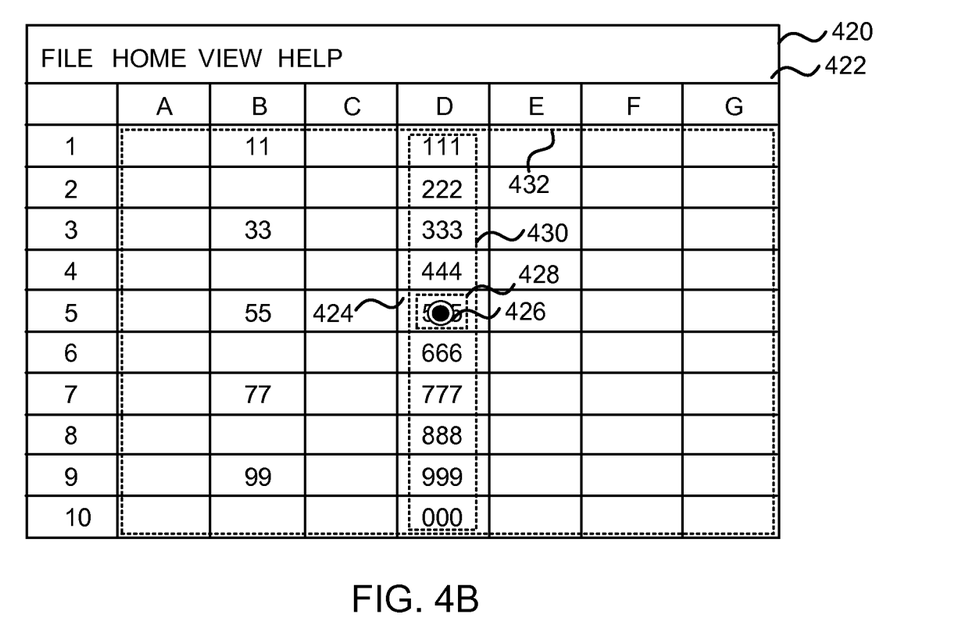
FIG. 4B illustrates an embodiment for selecting one or more cells in a spreadsheet application.

FIG. 4B illustrates an embodiment for selecting one or more cells in a spreadsheet application with an apparatus 420 providing a graphical user interface. FIG. 4B illustrates a simplified spreadsheet application view. The application view comprises a set of menu items 422 for selecting various processing functions. The application view comprises also a window in which a user is able to insert data in one or more cells. FIG. 4B illustrates the embodiment using a touch sensitive-display as an example of the graphical user interface, wherein the touch-sensitive display is also able to detect multiple pressure levels when pressure is applied on the touch-sensitive display. Instead of the touch-sensitive display, it is possible to use a separate pressure level sensitive user input device, for example, a touch pad for detecting the user's touch and a separate display device for providing the graphical user interface to display the user's actions.

The user has filled in numbers in cells and wishes to select a one or more of these cells. When the user applies 426 pressure within a cell 424 and if the applied pressure level exceeds a predetermined pressure level, a selection area 428 may be provided on the touch sensitive display. The selection area 428 may be a separate visible area on the touch-sensitive display (for example, a dashed line rectangle as illustrated in FIG. 4B). Alternatively, the appearance of the cell 424 may be changed to indicate that it has been selected. Alternatively or in addition, tactile or audio feedback may be given to the user. If after that an increase is detected in the applied pressure level, the selection area 428 may be expanded in response to the increase in the applied pressure level.

In this embodiment, the selection area 428 first expands to a column level 430. If the user continues to increase the pressure level applied on the cell 424, the selection area 430 expands further to a table level 432.

If the user lifts his finger or decreases the pressure level below the predetermined pressure level, the cells within the selection area that was the latest selection area may remain selected, and the user is able to take further actions on the cells.

FIG. 4B illustrates a simple and intuitive solution for selecting cells in a spreadsheet application since the user does not have to move his finger or a stylus in order to select a larger cell set than just one cell.

Figure 5A:
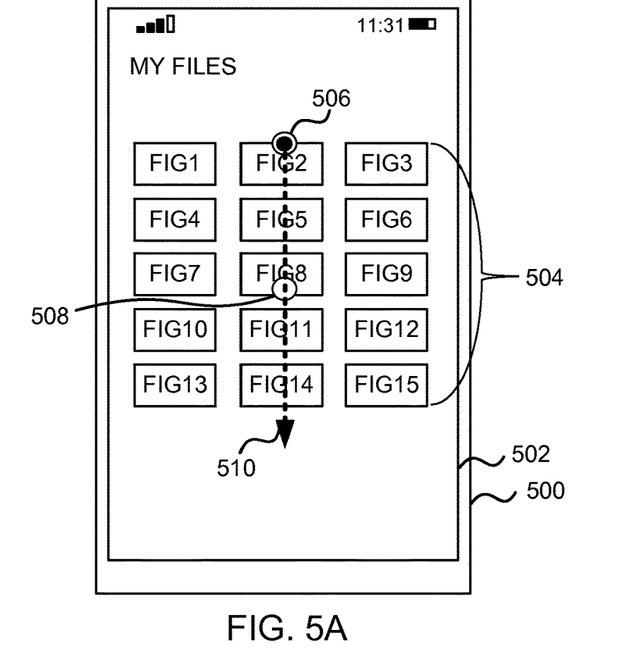
FIG. 5A illustrates an embodiment for selecting at least one graphical user interface item.

FIG. 5A illustrates an embodiment for selecting at least one graphical user interface item 504 with an apparatus 500 providing a graphical user interface 502. In this embodiment, the graphical user interface items 504 are image files. In other embodiments, the graphical user interface items 504 may comprise any other types of selectable items. FIG. 5A illustrates the embodiment using a touch-sensitive display, and the touch-sensitive display is also able to detect multiple pressure levels when pressure is applied on the touch-sensitive display. Instead of the touch-sensitive display, it is possible to use a separate pressure level sensitive user input device, for example, a touch pad for detecting the user's touch and a separate display device for providing a graphical user interface to display the user's actions.

In FIG. 5A a user applies pressure, for example, with a finger, multiple fingers or a stylus, on an image file 506 on the touch-sensitive display. The touch-sensitive display detects that the pressure level applied on the touch-sensitive display exceeds a predetermined pressure level. After applying the pressure at the location 506 and maintaining the pressure, the touch-sensitive display detects that the user provides a touch on the touch-sensitive display at a second location 508. The purpose of the second location 508 is to provide an indication of a direction 510 of selecting image files. When the user starts to increase the pressure level applied at the location 506, a selection area starting from the location 506 expands to the direction 510 indicated by the dashed line arrow. The term "selection area" may mean that every image file coinciding with a path starting from the touch location 506 towards the direction of the arrow 510 may be within the selection area and may thus be selected.

The user may control the extent of the selection area by the pressure level applied at the location 506. When the pressure level applied at the location 506 exceeds the predetermined pressure level and the user still increases the applied pressure level, the selection area expands towards the direction of the arrow 510. The selection area may thus go further than the second location 508. In another embodiment, the second location 508 may provide a limit to the selection area, enabling only selection of items between the location 506 and the second location 508. The length of the arrow 510 may illustrate the amount of selected image files and it may be directly proportional to the increase in the applied pressure level. The more pressure the user applies, the more image files become selected in the direction of the arrow 510. Alternatively or in addition, the user may be provided with some other type of visual indication indicating the selected image files.

In another embodiment, after applying a pressure level exceeding the predetermined pressure level, the user needs only once increase the pressure level further in order to control the size of the selection area. If the user keeps the increased pressure level, a timer may be used to control the length of the arrow 510 and thus also extend the selection area step by step. For example, subsequent image files may be selected starting from the location 506 (and the image file FIG. 2), for example, by 0.5 s steps.

If the user lifts his finger or decreases the pressure level below the predetermined pressure level, the item or items within the latest selection area remain selected, and the user is able to take further actions on the item(s).

By indicating a direction with a second touch, the user may easily and intuitively control the direction of expanding the selection area.

Figure 5B:
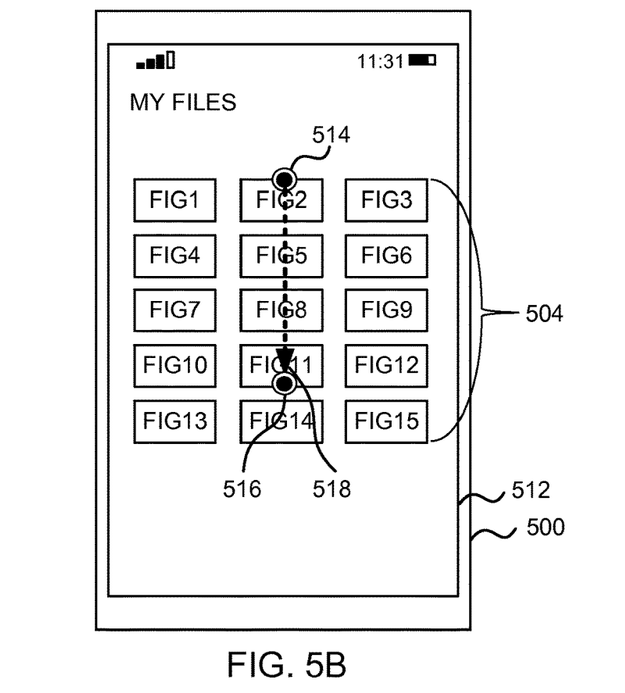
FIG. 5B illustrates an embodiment for selecting at least one graphical user interface item.

FIG. 5B illustrates an embodiment for selecting at least one graphical user interface item 504 with an apparatus 500 providing a graphical user interface 502. In this embodiment, the graphical user interface items 504 are image files. In other embodiments, the graphical user interface items 504 may comprise any other types of selectable items. FIG. 5B illustrates the embodiment using a touch-sensitive display that is able also to detect pressure levels of an applied touch as an example of the graphical user interface. Instead of the touch-sensitive display, it is possible to use a separate pressure level sensitive user input device, for example, a touch pad for detecting the user's touch and a separate display device for providing a graphical user interface to display the user's actions.

In FIG. 5B a user applies pressure, for example, with a finger, multiple fingers or a stylus, on an image file 514 on the touch-sensitive display. The touch-sensitive display detects that the pressure level applied on the touch-sensitive display exceeds a predetermined pressure level. Simultaneously or subsequently while maintaining applying pressure on the image file 514, the user applies pressure on an image file 516 and also this pressure exceeds the predetermined pressure level.

The pressure touch at the location 516 may mean that the user sets a direction and a limit to a selection area. In FIG. 5B this would mean that the user is able to select at most image files FIG. 2, FIG. 5, FIG. 8 and, FIG. 11. After applying the pressure exceeding the predetermined pressure level at the locations 514 and 516, and then increasing the pressure level, the user is able to select one or more image files starting from the image file 514 towards the image file 516. The term "selection area" may mean that every image file coinciding with a path starting from the touch location 514 until the touch location 516 towards the direction of an arrow 518 may be within the selection area.

The user may control the extent of the selection area by the pressure level applied at the locations 514 and 516. When the applied pressure level exceeds the predetermined pressure level and the user still increases the applied pressure level, the selection area expands starting from the location 514 towards the direction of the arrow 518. The length of the arrow 518 may illustrate the amount of selected image files and it may be directly proportional to the increase in the applied pressure level. The more pressure the user applies, the more image files become selected in the direction of the arrow 518. Further, in this embodiment, the user is not able to select an image file FIG. 14 since the user earlier indicated by the pressure touch on the location 516 that the selection area cannot go further from the location 516. Alternatively or in addition, the user may be provided with some other type of visual indication indicating the selected image files.

In another embodiment of FIG. 5B, the selection area may go beyond the second location 516. The second location 516 may provide an indication of the direction 518 of selecting image files. When the user starts to increase the applied pressure level, the selection area starting from the location 514 expands to the direction 518 indicated by the dashed line arrow enabling also the selection of items beyond the second location 516, for example, the image file FIG. 14.

In another embodiment, after applying a pressure level exceeding the predetermined pressure level, the user needs only once increase the pressure level further in order to control the size of the selection area. If the user keeps the increased pressure level, a timer may be used to control the length of the arrow 518 and thus also extend the selection area step by step. For example, subsequent image files may be selected starting from the location 514 (and the image file FIG. 2), for example, by 0.5 s steps.

If the user lifts his fingers or decreases the pressure level below the predetermined pressure level, the item or item within the latest selection area remain selected, and the user is able to take further actions on the item(s).

By indicating a direction and a selection limit with a second pressure touch, the user is easily and intuitively able to control the direction of expanding the selection area and to limit the maximum number of selectable user interface elements.

Figure 6:
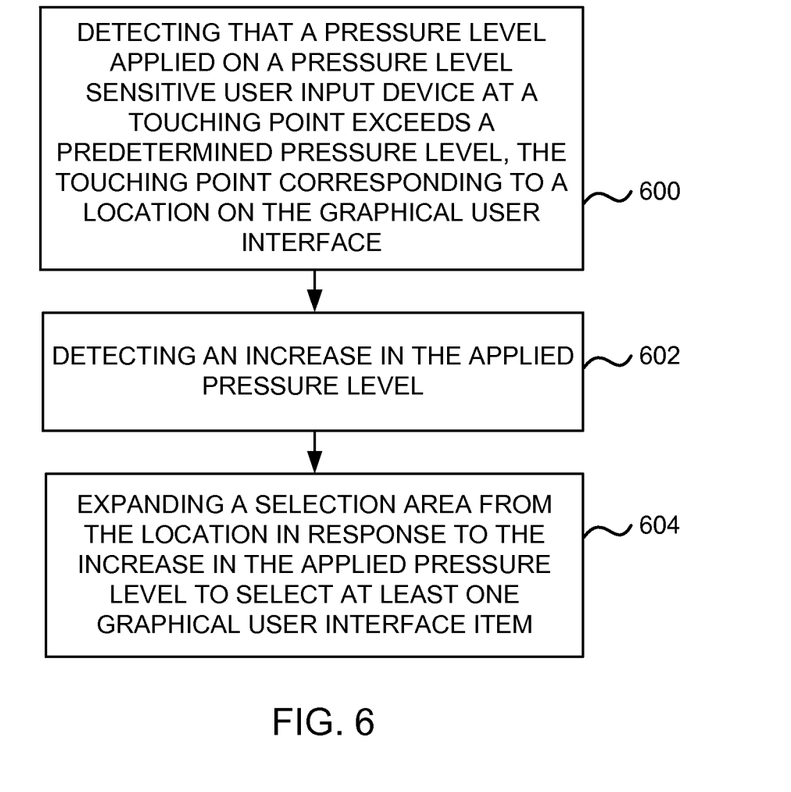
FIG. 6 discloses a flow diagram illustrating an embodiment of a method for selecting at least one graphical user interface item.

FIG. 6 discloses a flow diagram illustrating an embodiment of a method for selecting at least one graphical user interface item.

In 600 it is detected that a pressure level applied on the pressure level sensitive user input device at a touching point exceeds a predetermined pressure level, the touching point corresponding to a location on a graphical user interface.

In 602 an increase is detected in the applied pressure level.

In 604 selection or a selection area is expanded from the location in response to the increase in the applied pressure level to select at least one graphical user interface item.

At least some of the embodiments provide one or more of the following effects. A solution is provided that enables a simple and intuitive way to select one or more graphical user interface items. Further, in order to select multiple items, the user does not have to move his finger or stylus from the original touching point since the selection is based on the pressure level applied on the touching point. Further, when using a touch a second location, the user is able to easily and intuitively provide an indication of a direction towards which to expand the selection. Further, when using a touch a second location to set a selection direction and a selection limit, the user is able to easily and intuitively control the maximum number of items that can be selected in a certain direction.

According to an aspect, there is provided an apparatus comprising at least one processing unit, at least one memory, a pressure level sensitive user input device, and a graphical user interface. The at least one memory stores program instructions that, when executed by the at least one processing unit, cause the apparatus to detect that a pressure level applied on the pressure level sensitive user input device at a touching point exceeds a predetermined pressure level, the touching point corresponding to a location on the graphical user interface, detect an increase in the applied pressure level, and expand a selection area from the location in response to the increase in the applied pressure level to select at least one graphical user interface item.

In one embodiment, the expansion of the selection area is directly proportional to the increase in the applied pressure level.

In one embodiment, alternatively or in addition, the at least one memory stores program instructions that, when executed by the at least one processing unit, cause the apparatus to expand the selection area from the location on the graphical user interface radially.

In one embodiment, alternatively or in addition, the at least one memory stores program instructions that, when executed by the at least one processing unit, cause the apparatus to expand the selection area from the location on the graphical user interface only in one direction.

In one embodiment, alternatively or in addition, the at least one memory stores program instructions that, when executed by the at least one processing unit, cause the apparatus to expand the selection area from the location on the graphical user interface as long as the applied pressure level exceeds the predetermined pressure level.

In one embodiment, alternatively or in addition, the at least one memory stores program instructions that, when executed by the at least one processing unit, cause the apparatus to select all graphical user interface items within the selection area.

In one embodiment, alternatively or in addition, the at least one memory stores program instructions that, when executed by the at least one processing unit, cause the apparatus to expand the selection area in a text document at least one of from a word to a sentence, from the sentence to a paragraph, or from the paragraph to a page in response to the increase in the applied pressure level.

In one embodiment, alternatively or in addition, the at least one memory stores program instructions that, when executed by the at least one processing unit, cause the apparatus to expand the selection area in a spreadsheet document at least one of from a cell to a column or row or from the column or row to a table in response to the increase in the applied pressure level.

In one embodiment, alternatively or in addition, the at least one memory stores program instructions that, when executed by the at least one processing unit, cause the apparatus to detect that the pressure level applied on the pressure level sensitive user input device at the touching point becomes lower than the predetermined pressure level, and maintain selection of the at least one graphical user interface item.

In one embodiment, alternatively or in addition, the at least one memory stores program instructions that, when executed by the at least one processing unit, cause the apparatus to detect a touch on the pressure level sensitive user input device at a second touching point, the second touching point corresponding to a second location on the graphical user interface, and expand the selection area from the location towards the second location in response to the increase in the applied pressure level to select at least one graphical user interface item.

In one embodiment, alternatively or in addition, the at least one memory stores program instructions that, when executed by the at least one processing unit, cause the apparatus to detect a touch on the pressure level sensitive user input device at a second touching point, the second touching point corresponding to a second location on the graphical user interface, and expand the selection area from the location towards the second location in response to the increase in the applied pressure level to select at least one graphical user interface item between the location and the second location on the graphical user interface.

In one embodiment, alternatively or in addition, the at least one memory stores program instructions that, when executed by the at least one processing unit, cause the apparatus to detect that a pressure level applied on the pressure level sensitive user input device at a second touching point exceeds the predetermined pressure level, the second touching point corresponding to a second location on the graphical user interface, and expand the selection area from the location towards the second location in response to the increase in the applied pressure level to select at least one graphical user interface item between the location and the second location on the graphical user interface.

In one embodiment, alternatively or in addition, the at least one memory stores program instructions that, when executed by the at least one processing unit, cause the apparatus to detect that a pressure level applied on the pressure level sensitive user input device at a second touching point exceeds the predetermined pressure level, the second touching point corresponding to a second location on the graphical user interface, and expand the selection area from the location towards the second location in response to the increase in the applied pressure level to select at least one graphical user interface item.

In one embodiment, alternatively or in addition, the pressure level sensitive user input device and the graphical user interface are provided by a touch and pressure level sensitive display.

In one embodiment, alternatively or in addition, the apparatus is a mobile wireless communication device.

According to another aspect, there is provided a method comprising detecting that a pressure level applied on a pressure level sensitive user input device at a touching point exceeds a predetermined pressure level, the touching point corresponding to a location on a graphical user interface, detecting an increase in the applied pressure level, and expanding a selection area from the location in response to the increase in the applied pressure level to select at least one graphical user interface item.

In one embodiment, the expansion of the selection area is directly proportional to the increase in the applied pressure level.

In one embodiment, alternatively or in addition, the expanding comprises expanding the selection area from the location on the graphical user interface radially.

In one embodiment, alternatively or in addition, the expanding comprises expanding the selection area from the location on the graphical user interface only in one direction.

In one embodiment, alternatively or in addition, the expanding comprises expanding the selection area from the location on the graphical user interface as long as the applied pressure level exceeds the predetermined pressure level.

In one embodiment, alternatively or in addition, the method further comprises selecting all graphical user interface items within the selection area.

In one embodiment, alternatively or in addition, the expanding comprises expanding the selection area in a text document at least one of from a word to a sentence, from the sentence to a paragraph, or from the paragraph to a page in response to the increase in the applied pressure level.

In one embodiment, alternatively or in addition, the expanding comprises expanding the selection area in a spreadsheet document at least one of from a cell to a column or row or from the column or row to a table in response to the increase in the applied pressure level.

In one embodiment, alternatively or in addition, the method further comprises detecting that the pressure level applied on the pressure level sensitive user input device at the touching point becomes lower than the predetermined pressure level, and maintaining selection of the at least one graphical user interface item.

In one embodiment, alternatively or in addition, the method further comprises detecting a touch on the pressure level sensitive user input device at a second touching point, the second touching point corresponding to a second location on the graphical user interface, and wherein the expanding comprises expanding the selection area from the location towards the second location in response to the increase in the applied pressure level to select at least one graphical user interface item.

In one embodiment, alternatively or in addition, the method further comprises detecting a touch on the pressure level sensitive user input device at a second touching point, the second touching point corresponding to a second location on the graphical user interface, and wherein the expanding comprises expanding the selection area from the location towards the second location in response to the increase in the applied pressure level to select at least one graphical user interface item between the location and the second location on the graphical user interface.

In one embodiment, alternatively or in addition, the method further comprises detecting that a pressure level applied on the pressure level sensitive user input device at a second touching point exceeds the predetermined pressure level, the second touching point corresponding to a second location on the graphical user interface, and wherein the expanding comprises expanding the selection area from the location towards the second location in response to the increase in the applied pressure level to select at least one graphical user interface item between the location and the second location on the graphical user interface.

In one embodiment, alternatively or in addition, the method further comprises detecting that a pressure level applied on the pressure level sensitive user input device at a second touching point exceeds the predetermined pressure level, the second touching point corresponding to a second location on the graphical user interface, and wherein the expanding comprises expanding the selection area from the location towards the second location in response to the increase in the applied pressure level to select at least one graphical user interface item.

According to an aspect, there is provided an apparatus comprising at least one processing unit, at least one memory and a touch and pressure level sensitive display configured to provide a graphical user interface. The at least one memory stores program instructions that, when executed by the at least one processing unit, cause the apparatus to detect that a pressure level applied on the touch and pressure level sensitive display at a touching point exceeds a predetermined pressure level, the touching point corresponding to a location on the graphical user interface, detect an increase in the applied pressure level, and expand a selection area from the location in response to the increase in the applied pressure level to select at least one graphical user interface item.

According to an aspect, there is provided an apparatus comprising a pressure level sensitive user input device, and a graphical user interface. The apparatus further comprises means for detecting that a pressure level applied on the pressure level sensitive user input device at a touching point exceeds a predetermined pressure level, the touching point corresponding to a location on the graphical user interface, means for detecting an increase in the applied pressure level, and means for expanding a selection area from the location in response to the increase in the applied pressure level to select at least one graphical user interface.

According to an aspect, there is provided an apparatus comprising a touch and pressure level sensitive display configured to provide a graphical user interface. The apparatus further comprises means for detecting that a pressure level applied on the touch and pressure level sensitive display at a touching point exceeds a predetermined pressure level, the touching point corresponding to a location on the graphical user interface, means for detecting an increase in the applied pressure level, and means for expanding a selection area from the location in response to the increase in the applied pressure level to select at least one graphical user interface item.

In one embodiment, the means may be implemented using at least one processing unit and at least one memory comprising suitable program code.

According to another aspect, there is provided a computer program comprising program code, which when executed by at least one processor, causes to perform detecting that a pressure level applied on a pressure level sensitive user input device at a touching point exceeds a predetermined pressure level, the touching point corresponding to a location on a graphical user interface, detecting an increase in the applied pressure level, and expanding a selection area from the location in response to the increase in the applied pressure level to select at least one graphical user interface item.

In one embodiment, the computer program is embodied on a computer-readable medium.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus, comprising:
   at least one processing unit;
   at least one memory;
   a pressure level sensitive user input device; and
   a graphical user interface;
   wherein the at least one memory stores program instructions that, when executed by the at least one processing unit, cause the apparatus to:
   detect that a pressure level applied on the pressure level sensitive user input device at a touching point exceeds a predetermined pressure level, the touching point corresponding to a location on the graphical user interface;
   detect an increase in the applied pressure level;
   while detecting the increase in the applied pressure level from the location on the graphical user interface, detecting a second touching point corresponding to a second location on the graphical user interface;
   expanding the selection area from the location on the graphical user interface only in the direction of the second location until a graphical user interface item is within the expanded selection area; and
   select the graphical user interface item within the expanded selection area.

2. An apparatus according to claim 1, wherein the expanding of the selection is stopped upon reaching the graphical user interface item.

3. An apparatus according to claim 1, wherein the at least one memory stores program instructions that, when executed by the at least one processing unit, cause the apparatus to:
   expand the selection area from the location on the graphical user interface radially.

4. An apparatus according to claim 1, wherein the at least one memory stores program instructions that, when executed by the at least one processing unit, cause the apparatus to:
   expand the selection area from the location on the graphical user interface only in one direction.

5. An apparatus according to claim 1, wherein the at least one memory stores program instructions that, when executed by the at least one processing unit, cause the apparatus to:
   expand the selection area from the location on the graphical user interface from a first object to a second object based on the applied pressure level being held for a predefined period of time.

6. An apparatus according to claim 1, wherein the at least one memory stores program instructions that, when executed by the at least one processing unit, cause the apparatus to:
   expand the selection area a first defined amount in response to the increased applied pressure level being held for a predefined period of time and expand the selection area a second defined amount in response to the increased applied pressure level being held for an additional of the predefined period of time.

7. An apparatus according to claim 1, wherein the at least one memory stores program instructions that, when executed by the at least one processing unit, cause the apparatus to:
expand the selection area in a text document at least one of from a word to a sentence, from the sentence to a paragraph, or from the paragraph to a page in response to the increase in the applied pressure level.

8. An apparatus according to claim 1, wherein the at least one memory stores program instructions that, when executed by the at least one processing unit, cause the apparatus to:
expand the selection area in a spreadsheet document at least one of from a cell to a column or row or from the column or row to a table in response to the increase in the applied pressure level.

9. An apparatus according to claim 1, wherein the at least one memory stores program instructions that, when executed by the at least one processing unit, cause the apparatus to:
detect that the pressure level applied on the pressure level sensitive user input device at the touching point becomes lower than the predetermined pressure level; and
maintain selection of the graphical user interface item.

10. An apparatus according to claim 1, wherein the at least one memory stores program instructions that, when executed by the at least one processing unit, cause the apparatus to:
detect a touch on the pressure level sensitive user input device at a second touching point, the second touching point corresponding to a second location on the graphical user interface; and
expand the selection area from the location towards the second location in response to the increase in the applied pressure level to select the graphical user interface item.

11. An apparatus according to claim 1, wherein the at least one memory stores program instructions that, when executed by the at least one processing unit, cause the apparatus to:
detect a touch on the pressure level sensitive user input device at a second touching point, the second touching point corresponding to a second location on the graphical user interface; and
expand the selection area from the location towards the second location in response to the increase in the applied pressure level to select the graphical user interface item between the location and the second location on the graphical user interface.

12. An apparatus according to claim 1, wherein the at least one memory stores program instructions that, when executed by the at least one processing unit, cause the apparatus to:
detect that a pressure level applied on the pressure level sensitive user input device at a second touching point exceeds the predetermined pressure level, the second touching point corresponding to a second location on the graphical user interface; and
expand the selection area from the location towards the second location in response to the increase in the applied pressure level to select the graphical user interface item between the location and the second location on the graphical user interface.

13. An apparatus according to claim 1, wherein the at least one memory stores program instructions that, when executed by the at least one processing unit, cause the apparatus to:
detect that a pressure level applied on the pressure level sensitive user input device at a second touching point exceeds the predetermined pressure level, the second touching point corresponding to a second location on the graphical user interface; and
expand the selection area from the location towards the second location in response to the increase in the applied pressure level to select the graphical user interface item.

14. A method, comprising:
detecting that a pressure level applied on a pressure level sensitive user input device at a touching point exceeds a predetermined pressure level, the touching point corresponding to a location on a graphical user interface;
detecting an increase in the applied pressure level;
while detecting the increase in the applied pressure level from the location on the graphical user interface, detecting a second touching point corresponding to a second location on the graphical user interface; and
expanding the selection area from the location on the graphical user interface only in the direction of the second location until a graphical user interface item is within the expanded selection area; and
selecting the graphical user interface item within the expanded selection area.

15. A method according to claim 14, wherein the expansion of the selection area is directly proportional to the increase in the applied pressure level.

16. A method according to claim 14, wherein the expanding comprises expanding the selection area from the location on the graphical user interface radially or expanding the selection area from the location on the graphical user interface only in one direction.

17. A method according to claim 14, wherein the expanding comprises expanding the selection area from the location on the graphical user interface as long as the applied pressure level exceeds the predetermined pressure level.

18. A method according to claim 14, further comprising:
detecting a touch on the pressure level sensitive user input device at a second touching point, the second touching point corresponding to a second location on the graphical user interface; and
wherein the expanding comprises expanding the selection area from the location towards the second location in response to the increase in the applied pressure level to select the graphical user interface item.

19. A method according to claim 14, further comprising:
detecting that a pressure level applied on the pressure level sensitive user input device at a second touching point exceeds the predetermined pressure level, the second touching point corresponding to a second location on the graphical user interface; and
wherein the expanding comprises expanding the selection area from the location towards the second location in response to the increase in the applied pressure level to select the graphical user interface item between the location and the second location on the graphical user interface.

20. An apparatus, comprising:
at least one processing unit;

at least one memory; and a touch and pressure level sensitive display configured to provide a graphical user interface;

wherein the at least one memory stores program instructions that, when executed by the at least one processing unit, cause the apparatus to:

detect that a pressure level applied on the touch and pressure level sensitive display at a touching point exceeds a predetermined pressure level, the touching point corresponding to a location on the graphical user interface;

detect an increase in the applied pressure level;

while detecting the increase in the applied pressure level from the location on the graphical user interface, detect a second touching point corresponding to a second location on the graphical user interface;

expand the selection area from the location on the graphical user interface only in the direction of the second location until a graphical user interface item is within the expanded selection area; and select the graphical user interface item within the expanded selection area.

\* \* \* \* \*